(12) United States Patent
Obradovich

(10) Patent No.: US 7,475,057 B1
(45) Date of Patent: Jan. 6, 2009

(54) SYSTEM AND METHOD FOR USER NAVIGATION

(75) Inventor: Michael L. Obradovich, San Clemente, CA (US)

(73) Assignee: American Calcar, Inc., Las Vegas, NV (US)

( * ) Notice: Subject to any disclaimer, the term of this patent is extended or adjusted under 35 U.S.C. 154(b) by 855 days.

(21) Appl. No.: 09/699,031

(22) Filed: Oct. 27, 2000

Related U.S. Application Data

(60) Provisional application No. 60/161,860, filed on Oct. 27, 1999.

(51) Int. Cl.
*G06F 17/30* (2006.01)
*G06F 7/00* (2006.01)

(52) U.S. Cl. .............................. 707/3; 707/10; 701/201; 701/202; 701/213

(58) Field of Classification Search ...................... 707/3, 707/4, 5, 10, 200; 201/1, 2, 201, 202, 213
See application file for complete search history.

(56) References Cited

U.S. PATENT DOCUMENTS

| | | | |
|---|---|---|---|
| 4,350,970 A | 9/1982 | von Tomkewitsch |
| 4,521,857 A | 6/1985 | Reynolds, III |
| 4,792,803 A | 12/1988 | Madnick et al. |
| 4,812,843 A | 3/1989 | Champion, III et al. |
| 4,977,509 A | 12/1990 | Pitchford et al. |
| 5,023,934 A | 6/1991 | Wheeless |
| 5,043,736 A | 8/1991 | Darnell et al. |
| 5,119,504 A | 6/1992 | Durboraw, III |
| 5,124,915 A | 6/1992 | Krenzel |
| 5,127,674 A | 7/1992 | Lamphere et al. |
| 5,164,904 A | 11/1992 | Sumner |
| 5,189,632 A | 2/1993 | Paajanen et al. |
| 5,225,843 A | 7/1993 | Thompson |
| 5,235,633 A | 8/1993 | Dennison et al. |
| 5,265,024 A | 11/1993 | Crabill et al. |
| 5,267,042 A | 11/1993 | Tsuchiya et al. |
| 5,272,638 A | 12/1993 | Martin et al. |
| 5,295,064 A | 3/1994 | Malec et al. |
| 5,299,132 A | 3/1994 | Wortham |
| 5,334,974 A | 8/1994 | Simms et al. |

(Continued)

FOREIGN PATENT DOCUMENTS

EP 0 829 704 A2 3/1998

(Continued)

OTHER PUBLICATIONS

Martin Wolk, "Microsoft unveils plans for car dashboard computer," Reuters Article, Copyright date 1998.

(Continued)

*Primary Examiner*—Baoquoc N. To
(74) *Attorney, Agent, or Firm*—Klein, O'Neill & Singh, LLP

(57) ABSTRACT

A user profile based navigation system. The navigation system stores location centric information in a database associated with a user profile. Information from the database is provided to users based on a selected user profile, which modifies the types of data provided to a user at a geographic location. Data in the database is loaded into the database based on user supplied information and an indication of user geographic location.

1 Claim, 16 Drawing Sheets

U.S. PATENT DOCUMENTS

| | | | |
|---|---|---|---|
| 5,335,276 A | 8/1994 | Thompson et al. | |
| 5,420,592 A | 5/1995 | Johnson | |
| 5,450,329 A | 9/1995 | Tanner | |
| 5,479,351 A | 12/1995 | Woo et al. | |
| 5,479,482 A | 12/1995 | Grimes | |
| 5,497,339 A | 3/1996 | Bernard | |
| 5,504,482 A | 4/1996 | Schreder | |
| 5,504,684 A | 4/1996 | Lau et al. | |
| 5,517,193 A | 5/1996 | Allison et al. | |
| 5,519,403 A | 5/1996 | Bickley et al. | |
| 5,523,950 A | 6/1996 | Peterson | |
| 5,528,248 A | 6/1996 | Steiner et al. | |
| 5,528,493 A | 6/1996 | Potter | |
| 5,539,645 A | 7/1996 | Mandhyan et al. | |
| 5,543,789 A | 8/1996 | Behr et al. | |
| 5,555,286 A | 9/1996 | Tendler | |
| 5,559,520 A | 9/1996 | Barzegar et al. | |
| 5,572,204 A | 11/1996 | Timm et al. | |
| 5,579,535 A | 11/1996 | Orlen et al. | |
| 5,600,796 A | 2/1997 | Okamura et al. | |
| 5,604,676 A | 2/1997 | Penzias | |
| 5,625,668 A | 4/1997 | Loomis et al. | |
| 5,627,547 A | 5/1997 | Ramaswamy et al. | |
| 5,627,549 A | 5/1997 | Park | |
| 5,630,068 A | 5/1997 | Vela et al. | |
| 5,638,279 A | 6/1997 | Kishi et al. | |
| 5,640,156 A | 6/1997 | Okuda et al. | |
| 5,642,285 A | 6/1997 | Woo et al. | |
| 5,648,763 A | 7/1997 | Long | |
| 5,648,769 A | 7/1997 | Sato et al. | |
| 5,652,379 A | 7/1997 | Fukatani | |
| 5,654,886 A | 8/1997 | Zereski, Jr. et al. | |
| 5,661,652 A | 8/1997 | Sprague et al. | |
| 5,663,548 A | 9/1997 | Hayashi et al. | |
| 5,673,039 A | 9/1997 | Pietzsch et al. | |
| 5,675,732 A | 10/1997 | Majeti et al. | |
| 5,677,837 A | 10/1997 | Reynolds | |
| 5,680,444 A | 10/1997 | Reeves | |
| 5,689,252 A | 11/1997 | Ayanoglu et al. | |
| 5,694,514 A | 12/1997 | Evans et al. | |
| 5,699,056 A | 12/1997 | Yoshida | |
| 5,699,255 A | 12/1997 | Ellis | |
| 5,717,748 A | 2/1998 | Sneed, Jr. et al. | |
| 5,719,936 A | 2/1998 | Hillenmayer | |
| 5,720,037 A | 2/1998 | Biliris et al. | |
| 5,724,316 A | 3/1998 | Brunts | |
| 5,727,053 A | 3/1998 | Sizer, II et al. | |
| 5,731,997 A | 3/1998 | Manson et al. | |
| 5,742,509 A | 4/1998 | Goldberg et al. | |
| 5,745,855 A | 4/1998 | Futamura | |
| 5,748,106 A | 5/1998 | Schoenian et al. | |
| 5,754,938 A * | 5/1998 | Herz et al. | 707/6 |
| 5,760,742 A | 6/1998 | Branch et al. | |
| 5,774,070 A | 6/1998 | Rendon | |
| 5,774,825 A | 6/1998 | Reynolds | |
| 5,774,827 A | 6/1998 | Smith, Jr. et al. | |
| 5,781,150 A | 7/1998 | Norris | |
| 5,786,789 A | 7/1998 | Janky | |
| 5,790,974 A | 8/1998 | Tognazzini | |
| 5,794,174 A | 8/1998 | Janky et al. | |
| 5,802,492 A | 9/1998 | DeLorme et al. | 701/200 |
| 5,809,247 A | 9/1998 | Richardson et al. | |
| 5,815,683 A | 9/1998 | Vogler | |
| 5,819,227 A | 10/1998 | Obuchi | |
| 5,852,810 A * | 12/1998 | Sotiroff et al. | 707/10 |
| 5,864,305 A | 1/1999 | Rosenquist | |
| 5,908,464 A | 6/1999 | Kishigami et al. | |
| 5,917,405 A | 6/1999 | Joao | 340/426 |
| 5,929,774 A | 7/1999 | Charlton | |
| 5,938,721 A | 8/1999 | Dussell et al. | |
| 5,946,626 A | 8/1999 | Foladare et al. | |
| 5,948,040 A | 9/1999 | DeLorme et al. | |
| 5,950,173 A | 9/1999 | Perkowski | |
| 5,963,956 A | 10/1999 | Smartt | |
| 5,982,298 A | 11/1999 | Lappenbusch et al. | |
| 5,999,124 A | 12/1999 | Sheynblat | |
| 5,999,877 A | 12/1999 | Takahashi et al. | |
| 6,021,371 A * | 2/2000 | Fultz | 701/200 |
| 6,028,550 A | 2/2000 | Froeberg et al. | 342/357.13 |
| 6,041,311 A * | 3/2000 | Chislenko et al. | 707/102 |
| 6,047,327 A | 4/2000 | Tso et al. | |
| 6,073,075 A * | 6/2000 | Kondou et al. | 701/203 |
| 6,075,874 A | 6/2000 | Higashikubo et al. | |
| 6,087,965 A | 7/2000 | Murphy | 340/991 |
| 6,092,076 A | 7/2000 | McDonough et al. | |
| 6,107,939 A | 8/2000 | Sorden | 340/901 |
| 6,107,944 A | 8/2000 | Behr et al. | |
| 6,119,066 A | 9/2000 | Sugiura et al. | |
| 6,122,506 A | 9/2000 | Lau et al. | 455/427 |
| 6,124,825 A | 9/2000 | Eschenbach | 342/357.08 |
| 6,127,945 A | 10/2000 | Mura-Smith | 340/988 |
| 6,131,066 A | 10/2000 | Ahrens et al. | |
| 6,131,067 A | 10/2000 | Girerd et al. | |
| 6,133,853 A | 10/2000 | Obradovich et al. | |
| 6,134,501 A | 10/2000 | Oumi | |
| 6,141,610 A | 10/2000 | Rothert et al. | 701/35 |
| 6,144,920 A | 11/2000 | Mikame | |
| 6,147,598 A | 11/2000 | Murphy et al. | 340/426 |
| 6,148,261 A | 11/2000 | Obradovich et al. | |
| 6,154,745 A * | 11/2000 | Kari et al. | 707/100 |
| 6,163,749 A | 12/2000 | McDonough et al. | |
| 6,163,753 A | 12/2000 | Beckmann et al. | 701/213 |
| 6,166,626 A | 12/2000 | Janky et al. | 340/426 |
| 6,169,955 B1 | 1/2001 | Fultz | 701/200 |
| 6,182,067 B1 * | 1/2001 | Presnell et al. | 707/5 |
| 6,184,801 B1 | 2/2001 | Janky | 340/988 |
| 6,185,427 B1 | 2/2001 | Krasner et al. | |
| 6,188,957 B1 | 2/2001 | Bechtolsheim et al. | |
| 6,192,312 B1 | 2/2001 | Hummelsheim | |
| 6,192,314 B1 | 2/2001 | Khavakh et al. | |
| 6,199,013 B1 | 3/2001 | O'Shea | |
| 6,202,023 B1 * | 3/2001 | Hancock et al. | 701/201 |
| 6,208,934 B1 | 3/2001 | Bechtolsheim et al. | |
| 6,212,392 B1 | 4/2001 | Fitch et al. | |
| 6,212,470 B1 | 4/2001 | Seymour et al. | |
| 6,212,472 B1 | 4/2001 | Nonaka et al. | |
| 6,212,473 B1 | 4/2001 | Stefan et al. | |
| 6,212,550 B1 | 4/2001 | Segur | |
| 6,215,857 B1 | 4/2001 | Kasiviswanathan | 379/67.1 |
| 6,215,993 B1 | 4/2001 | Ulveland | 455/415 |
| 6,219,557 B1 | 4/2001 | Havinis | 455/456 |
| 6,219,614 B1 | 4/2001 | Uchigaki et al. | 701/211 |
| 6,219,694 B1 | 4/2001 | Lazaridis et al. | |
| 6,292,743 B1 * | 9/2001 | Pu et al. | 701/202 |
| 6,321,158 B1 | 11/2001 | DeLorme et al. | |
| 6,332,127 B1 | 12/2001 | Bandera et al. | |
| 6,334,087 B1 * | 12/2001 | Nakano et al. | 701/208 |
| 6,374,237 B1 * | 4/2002 | Reese | 707/3 |
| 6,421,675 B1 * | 7/2002 | Ryan et al. | 707/100 |
| 6,427,121 B2 * | 7/2002 | Brodie | 701/213 |
| 6,466,862 B1 * | 10/2002 | DeKock et al. | 701/117 |
| 6,529,143 B2 * | 3/2003 | Mikkola et al. | 340/995.1 |
| 6,546,002 B1 * | 4/2003 | Kim | 370/351 |
| 6,574,734 B1 * | 6/2003 | Colson et al. | 713/200 |
| 6,680,694 B1 * | 1/2004 | Knockeart et al. | 342/357.09 |
| 6,707,421 B1 * | 3/2004 | Drury et al. | 342/357.1 |
| 6,745,188 B2 * | 6/2004 | Bradburn | 707/10 |
| 6,954,735 B1 * | 10/2005 | Djupsjobacka et al. | 705/27 |

FOREIGN PATENT DOCUMENTS

| | | |
|---|---|---|
| EP | 0 853 287 A2 | 7/1998 |
| JP | 9-231263 | 5/1997 |

| | | |
|---|---|---|
| WO | WO 99/33293 | 7/1999 |

OTHER PUBLICATIONS

Edward W. Desmond, "Malone Again," Fortune Cover Stories, Publication Date Feb. 16, 1998, pp. 66, 68 & 69.
Alcatel web pages, Alcatel, Nov. 24, 1998 (58 pages).
Giga Information Group, Inc. web pages, Giga Information Group, Inc. Nov. 24, 1998 (4 pages).
Spyglass web pages, Spyglass, Nov. 24, 1998 (58 pages).
Think Thin, PC Magazine, Dec. 1, 1998 (p. 9).
McDonald, Keith D., "Course 122—GPS Fundamentals & Applications", Navtech Seminars & GPS Supply, Inc., Catamaran Resort Hotel, San Diego, CA, Mar. 22-23, 1999 (336 sheets).
Kelley, Tom, "Traffic Control Traffic Data, Unplugges", ITS World, Jul./Aug. 2000 (pp. 28-30).
Bishop, Richard, "The Final Stop Remember IVHS?", ITS World, Jul./Aug. 2000 (pp. 14-15).
Metricom in the News, web pages, Metricom, Inc., Nov. 24, 1998 (8 pages).
Geosystems, Home and Corporate web pages, 4 pages.
Geosystems, Products and MapRoom web pages, Products & Services, 23 pages.
Geosystems, Corporate web pages, Corporate Backgrounder, 14 pages.
WorldPages web pages, 5 pages.
DineNet web pages, 19 pages.
AAA Map'n'Go Travel Package web pages, 7 pages.
Nokia 9000 Communicator web pages, 16 pages.
Global Map 2000 web pages, 6 pages.
Demmler, "Another Car Navagation System," Automotive Engineering, Jun. 1996, pp. 87, 89, 2 pages.
Sedgwick, "Butterfly gives clue to cars of tomorrow", Automotive News, Oct. 28, 1996, p. 43, 2 pages.
Jewett, "Toyota offers navigation system as U.S. option," Automotive News, Nov. 18, 1996, p. 16, 2 pages.
Yamaguchi, "Honda in-car navigation system for the U.S.," Automotive Engineering, Jun. 1996, pp. 82-84, 3 pages.
Heuchert, "Eyes Forward: An ergonomic solution to driver information overload," Automotive Engineering, Sep. 1996, pp. 27-31, 5 pages.
Noriyuki, "Just Think of It as a Big Eye in the Sky . . . Watching," Los Angeles Times, Section E, pp. 1, 8, Apr. 27, 1997, 3 pages.
BigYellow web pages, 6 pages.
Maps On Us web pages, 14 pages.
Maps On Us web pages, Search Categories, 14 pages.
Mapquest web pages, 1 page.
Advertisement, "Collision Avoidance is Critical . . . Now it's Affordable," 1 page.
Advertisement, "Duats," 1 page.
"Trimble Demonstrates Trimconnect," Flying, Jul. 1997, p. 51, 1 page.
Advertisement, "MFD 5200 Multi-Function Display," 1 page.
Advertisement, "SUPER Road Whiz", 2 pages.
Yoshikazu Noguchi, "Intelligent Car—History and the Future in Japan and Toyota," Toyota Motor Corporation 98C015, pp. 121-125 (5 pages).
Monet (Mobile Network), 2 pages.
Steve Dye with Dr. Frank Baylin, The GPS Manual Principles and Applications, "Land Navigation Markets—Overview", Feb. 1997, ISBN:0-917893-29-8, 23 pages.
PCT Written Opinion for International Application PCT/US00/29520 dated Aug. 28, 2001.
International Search Report for PCT/US00/29520 mailed Jan. 2, 2001.
Supplemental Search Report for European Patent Application No. 00972367.7, dated Jan. 21, 2003, (4 pgs).
American Calcar Inc. "Summons to Attend Oral Proceedings Pursuant to Rule 71(1) EPC" and "Annex To Summons To Oral Proceedings" issued on Dec. 22, 2004 in connection with European Patent Application No. 00972367.7-2201, filed Oct. 27, 2000 (5 pgs.).
American Calcar Inc. "Communication Pursuant to Article 96(2) EPC" issued on Aug. 1, 2003 in connection with European Patent Application No. 00972367.7-2201, filed Oct. 27, 2007 (7 pgs.).
Eleftheriadis, et al. "User Profile Identification In Future Mobile Telecommunications Systems", IEEE Network, IEEE Inc. NewYork, U.S. Vo. 8, No. 5, Sep./Oct. 1994 (p. 33-39).
European Search Report dated Jun. 23, 2005 for European Patent Application No. EP 05 00 4271.2-2201, filed Mar. 2, 2005, European Search Report mailed Jul. 5, 2005 (5 pgs.).
Geosystems, Home and Corporate web pages, 4 pages, copyright date 1997.
Geosystems, Products and MapRoom web pages, Products & Services, 23 pages, copyright date 1997.
Geosystems, Corporate web pages, Corporate Backgrounder, 14 pages, copyright 1997.
WorldPages web pages, 5 pages, Aug. 20, 2002.
DineNet web pages, 19 pages, Aug. 20, 2002.
AAA Map'n'Go Travel Package web pages, 7 pages, Feb. 27, 1997.
Nokia 9000 Communicator web pages, 16 pages, Jan. 28, 1997 (downloaded).
BigYellow web pages, 6 pages, copyright date 1997.
Maps On Us web pages, 14 pages, copyright date 1996.
Maps On Us web pages, Search Categories, 14 pages, copyright date 1996.
Mapquest web pages, 1 page, copyright date 1997.
Global Map 2000 web pages, 6 pages, copyright date 1996.
Advertisement, "Collision Avoidance is Critical . . . Now it's Affordable," 1 page, Aug. 20, 2002.
Advertisement, "Duats," 1 page, Aug. 20, 2002.
Advertisement, "MFD 5200 Multi-Function Display," 1 page, Aug. 20, 2002.
Advertisement, "SUPER Road Whiz", 2 pages, Aug. 20, 2002.
Yoshikazu Noguchi, "Intelligent Car—History and the Future in Japan and Toyota," Toyota Motor Corporation 98C015, pp. 121-125 (5 pages), 1998.
Monet (Mobile Network), 2 pages, Nov. 1997.

* cited by examiner

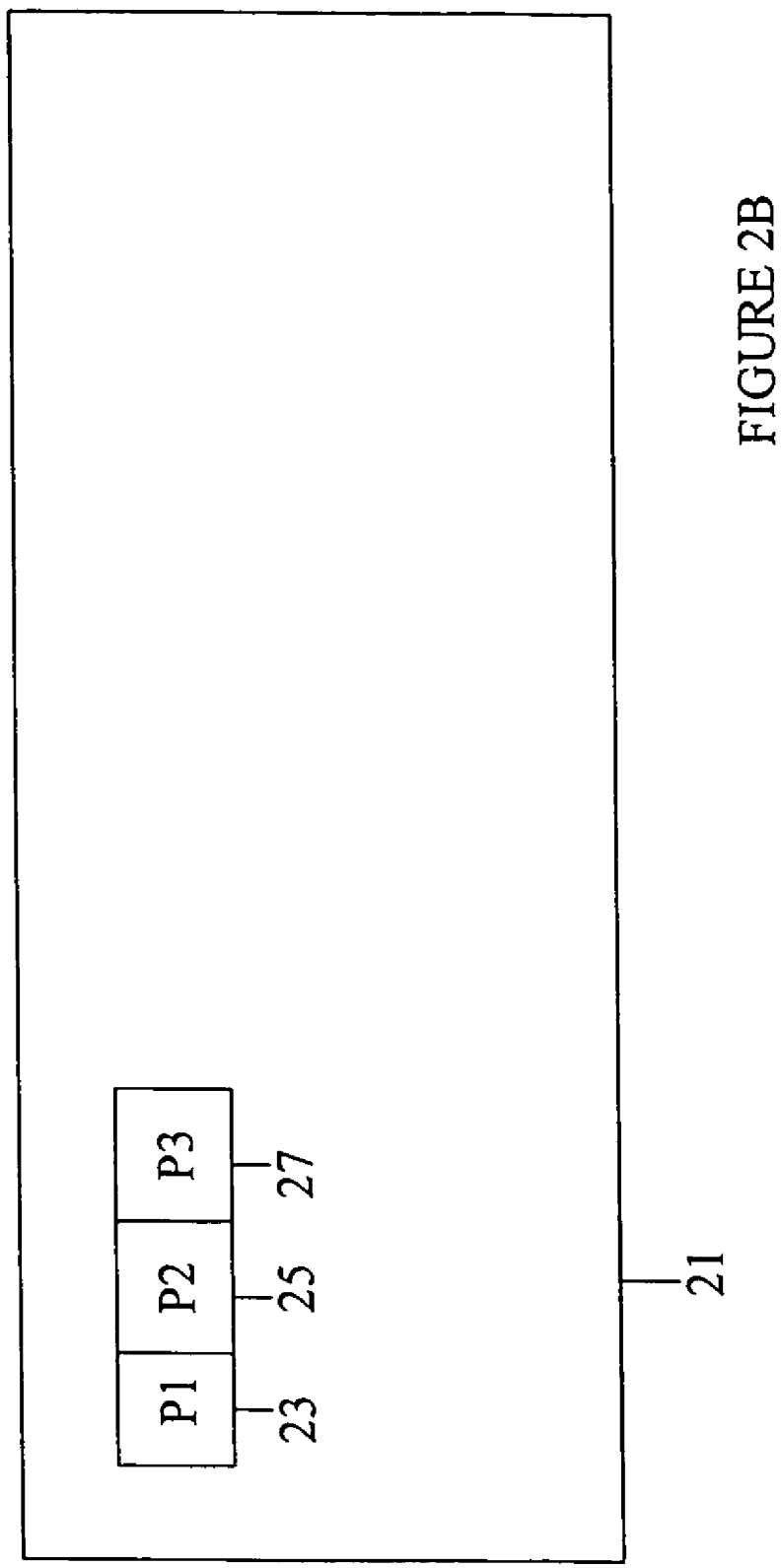

CREATE NEW PROFILE
(TEXT) 53 55

ENROUTE PROFILE

MUSIC
ENTERTAINMENT
SPORTS
SERVICES
RESTAURANTS
SHOPPING

[EDIT]

FAVORITES

● ON ○ OFF    RADIUS [5] MILES
[EDIT]    [CANCEL]

PROFILE NAME
AGE
SEX
MARITAL STATUS
OCCUPATION
CITY
EDUCATION
REIGION
CHILDREN

51

[SUBMIT NEW PROFILE]

EDIT PROFILE
(TEXT)

90
PROFILE NAME  VACATION
AGE  33
SEX  MALE
MARITAL STATUS  SINGLE
OCCUPATION  GRAPHIC ARTIST
CITY  MISSION VIEJO
EDUCATION  COLLEGE DIPLOMA
REIGION  NONE
CHILDREN  NONE

92 ENROUTE PROFILE
MUSIC  COUNTRY
       JAZZ
ENTERTAINMENT  MOVIES
               COUNTRY CONCERTS
SPORTS  BASKETBALL
        GOLF
SERVICES  AUTOMOTIVE
          SHOE REPAIR
RESTAURANTS  FINE DINNING
             FAST FOOD
SHOPPING
[EDIT]
[SUBMIT NEW PROFILE]

94 FAVORITES
ALL
○ HOME DEPOT
⊙ WELLS FARGO
○ VONS
○ CHEVRON
○ JACK IN THE...
○ COMP USA
○ SPORTMART
○ MACY'S
⊙ KMART
⊙ ON ○ OFF  RADIUS [15] MILES
[EDIT]  [CANCEL]

POPULATES DATABASE AND MAP WHILE ENROUTE

ENROUTE PROFILE SETTINGS

1211 — PROFILE [VACATION ▼] [EDIT]   ALL ● ON ○ OFF   ● ENROUTE — 1233   ○ DESTINATION — 1235

SETTINGS — 1231
| POPULATE MY EXPERT DATABASE | ● ON ○ OFF | PROFILE TOPIC CHAT ROOMS | ● ON ○ OFF | LIVE ● SAVED ○ | SET RADIUS 5 MILES |
|---|---|---|---|---|---|

✓ BLOCK ✓ CITY ✓ COUNTY ✓ STATE ✓ ZIP

1213 —
MUSIC
○ R&B
○ RAP
○ METAL
○ ALTERNATIVE
○ PROGRESSIVE
○ CLASSIC ROCK
○ COUNTRY
○ JAZZ

ENTERTAINMENT
○ THEATRES-LIVE
○ THEATRES
○ AMUSE. PARKS
○ FESTIVALS
○ CARNIVALS
○ CONCERTS
○
○  1215

RECREATION
○ SURFING
○ CAMPING
○ SKIING
○ HIKING
○ MINITURE GOLF
○
○  1217
○

RESTAURANTS — 1219
○ (ING)
○ (HOP)
○ FAST FOOD
○ ITALIAN
○ FRENCH
○ AMERICAN
○ CHINESE
○

1221 —
MISCELANEOUS
○ STADIUMS
○ REST STOPS
○ CHURCHES
○ HOSPITALS
○ AUTO DEALERS
○ EQUESTRIAN
○ POINTS OF INT.
○

SHOPPING
○ DEPT. STORES
○ ANTIQUES
○ MALL
○ OUTLET
○
○
○  1223
○

SPORTS
○ TENNIS
○ FOOTBALL
○ BASEBALL
○ BASKETBALL
○ HOCKEY
○ NASCAR
○ BOXING  1225
○ SOCCER

SERVICES — 1227
○ HOTEL/MOTELS
○ AUTOMOTIVE
○ RENTAL CARS
○ AIRLINE
○ GOVERNMENT
○ DELIVERY
○ GROCERS
○ BANKS

| FRIEND FINDER | ENTER NAME | ENTER ADDRESS | ENTER PCD NUMBER |
|---|---|---|---|
| FRIEND 1 | SID JOHNSON | 231 ISLAND SAN DIEGO CA | |
| FRIEND 2 | | | |
| FRIEND 3 | | | |

| BUSINESS FINDER | ENTER NAME OF BUSINESS | ENTER ADDRESS |
|---|---|---|
| FRIEND 1 | APS DESIGN | 543 MARKET ST. SAN DIEGO CA |
| FRIEND 2 | | |
| FRIEND 3 | | |

| JOB FINDER | ENTER TITLE OF EMPLOYMENT YOU ARE LOOKING FOR |
|---|---|
| FRIEND 1 | GRAPHIC DESIGN |
| FRIEND 2 | |
| FRIEND 3 | |

| ITEM FINDER | ENTER NAME/BRAND OF ITEM YOU WANT TO LOCATE |
|---|---|
| FRIEND 1 | MIKASA |
| FRIEND 2 | |
| FRIEND 3 | |

[SUBMIT]

SYSTEM AND METHOD FOR USER NAVIGATION

CROSS-REFERENCE TO RELATED APPLICATIONS

This application claims the benefit of U.S. Provisional Application No. 60/161,860, filed Oct. 27, 1999, the disclosure of which is incorporated by reference.

BACKGROUND OF THE INVENTION

This invention relates generally to navigation assistance devices, and more particularly to personalized computer-based electronic navigation devices.

Individual computers and computerized devices are able to store large amounts of information. With the advent of the Internet and the World Wide Web, a single computer may access information stored in a number physically separated computers using the Internet. With the proliferation of use of the Internet, numerous people, organizations, and entities have made information available to computer users. Many individuals have their own Web pages, and use their Web pages to present information of interest to them. Many organizations and entities similarly have Web pages describing their organization, purpose, and other information. Thus, individuals are able to access information about a variety of topics, presented by a variety of individuals and entities.

In addition, businesses are often supplementing this physical presence by placing information about their goods, services and products on the Web. Indeed many such businesses are solely Web-based. That is, some businesses may not provide a physical location which a customer or shopper may visit, but instead merely provide a presence on the Web for consumers to access via the Internet. Many businesses, however, combine a physical presence, such as a store site, with information about the store on the Web. Thus, computer users can determine the products, pricing, and other information relating to a store on the Web, and determine whether the consumer is interested in visiting the store and thereafter visiting the store.

Often the consumer is assisted in visiting the physical location of a store by receiving instructions over the Web as to how to, for example, drive to the location. Mapping services available from the Web, upon input of a desired destination and a current location, provide driving instructions as to how to get from a current destination to a desired location. Thus, it would appear that the Web provides a convenient way to learn about physical locations, such as stores, and how to get to those locations.

As discussed above, the amount of information available over the Web, is tremendous. The shear quantity of data available, however, also increases the difficulty in finding data desired by a consumer. Determining which data meets the needs of the consumer, as well as convenient presentation of such data, provides difficulties. Moreover, even for categories of information which appear to fit a consumer's need, some otherwise relevant data may not be desired by the consumer. For example, for certain types of goods a consumer may not wish to frequent a particular establishment, or desire to only frequent a few of a large number of establishments. Thus, a consumer may be presented with data from establishments the consumer has no desire to visit, and such information merely clutters the user's ability to rapidly locate information of interest.

Further, any one consumer may have a variety of interests. Such a consumer may not wish the information relevant to one aspect of the consumer's activities cluttering up requests for information regarding other aspects of the user's activities.

In addition, businesses desiring to place information regarding their business before certain types of consumers have no convenient way to do so. Businesses do not desire to place information before consumers who have no interest in their business, and that do wish to place information regarding their business before consumers who do or are likely to have an interest in the goods the business provides.

In addition, although consumers may be provided information on how to get to a business, while enroute the consumers receive no additional information about points of interest which they may be passing. In addition, consumers may realize, while in route, that they have a need to obtain other goods or services along the route. Such consumers may not have detailed information concerning their present location, and no convenient means to determine the availability of businesses stocking goods which they desire or need enroute, or how to reach such businesses.

SUMMARY OF THE INVENTION

In one aspect, the present invention provides a real world navigation system. In one embodiment the invention comprises a method of populating a database, including determining a tag location, requesting information concerning the tag location and providing the information to a computer system. In one embodiment determining the tag location comprises evaluating the position of a GPS capable device, waiting a preselected time period, reevaluating the position of the GPS capable device, and determining if the position has changed. In another embodiment, determining the tag location comprises presenting a map display using a computer to a user and receiving a selected position on the map display.

In alternative embodiments the tag location comprises a plurality of locations, and in one embodiment these locations are selected area and in another embodiment the locations are a route to a destination.

In other embodiments, the invention comprises a method of accessing a database using a profile. The profile comprises information applicable to a user, and serves as a filter between the database of information and the display to the user. In other embodiments, the profile is used in a push mode to push information desired by the user to the user, in other embodiments the profile serves as a filter in a pull mode pulling only information applicable to the user to the user.

In yet another embodiment the invention comprises an entertainment distribution system. The entertainment distribution system comprises an entertainment server receiving entertainment related computer files in a variety of formats. The entertainment computer related files are sequenced and organized by a user, and may thereafter request from requesting nodes various files or sequences of files in a format applicable to their requesting node.

These and other aspects of the present invention will be more readily understood when considered in connection with the drawings and the following detailed description.

BRIEF DESCRIPTION OF THE DRAWINGS

FIG. 2B illustrates a block diagram of an embodiment of a database of FIG. 2A;

FIG. 5 illustrates an input screen for creating a profile;

FIG. 7 illustrates an input screen for cloning a profile;

FIG. 8 illustrates input screen for editing a profile;

FIG. 12 illustrates an enroute profile settings screen;

DETAILED DESCRIPTION

Figure 1:
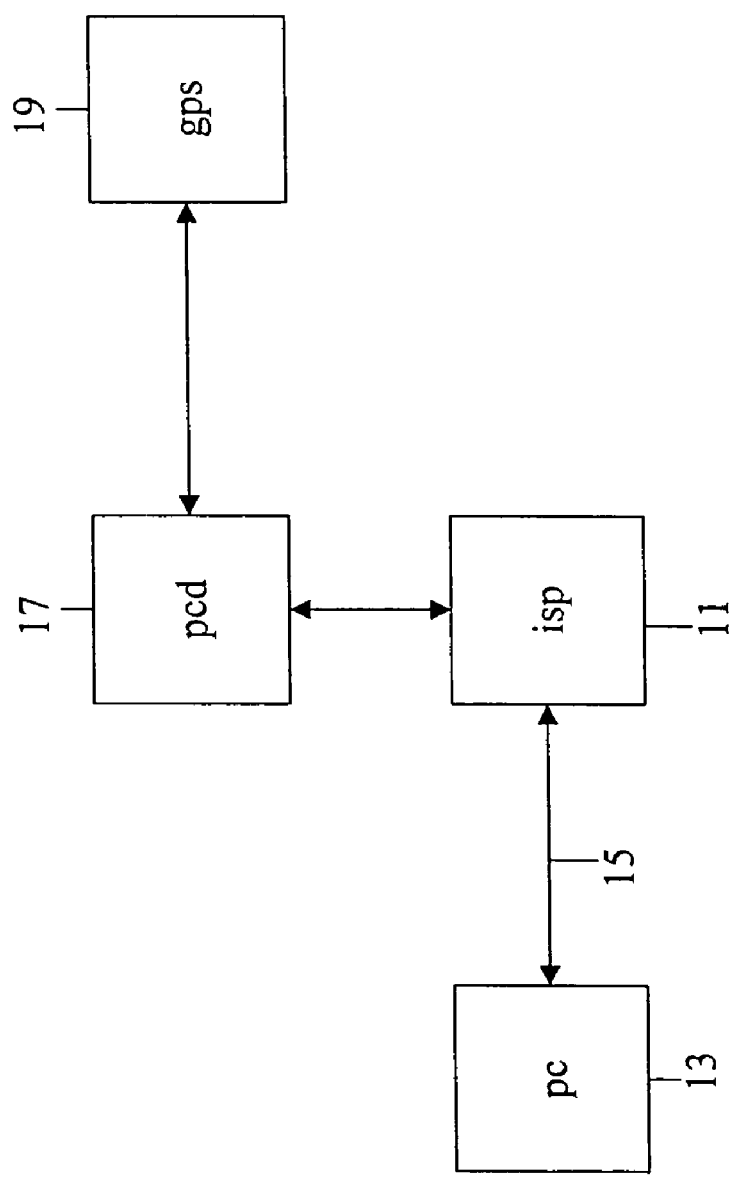
FIG. 1 illustrates a block diagram of a system of the present invention.

FIG. 1 illustrates a block diagram of a system of the present invention. An Internet service provider (ISP) 11, including a server, is linked to a user personal computer 13 via telephone lines 15. In actuality, one or more computer units may be interdisposed between the PC and the server, with the server being a node on the Internet. The server is also connected via communication link to a personal computer device 17. Circuitry to allow the PCD, sometimes in conjunction with external elements or computers, to determine the position of the PCD. For example, in one embodiment the PCD contains circuitry for receiving GPS signals and passing pertinent representations of the received signals to a base server for further processing. The base server, in turn, calculates the position of the PCD and transmits the position information to the PCD. Alternatively, the PCD contains a GPS receiver and processing system, and the PCD determines its position using the GPS receiver and processing system. In one embodiment, the personal computer device is a PCD of the type disclosed in U.S. patent application Ser. No. 08/879,955, the disclosure of which is incorporated herein by reference.

The server includes a database. The database includes information pertaining to a variety of topics. More specifically, in one embodiment the database includes information relating to locations. That is, the database includes information regarding specific locations, as well as information pertaining to transportation to and from these locations.

The information in the database is provided by businesses, individuals, and users of PCDs. Thus, the database contains general information provided by businesses, stores, and other commercial entities who wish to make information concerning their business available to others. The database also contains personalized information regarding points of interest and other matters provided by users of PCDs. The database therefore provides a source of information to the users of PCDs.

Figure 2A:
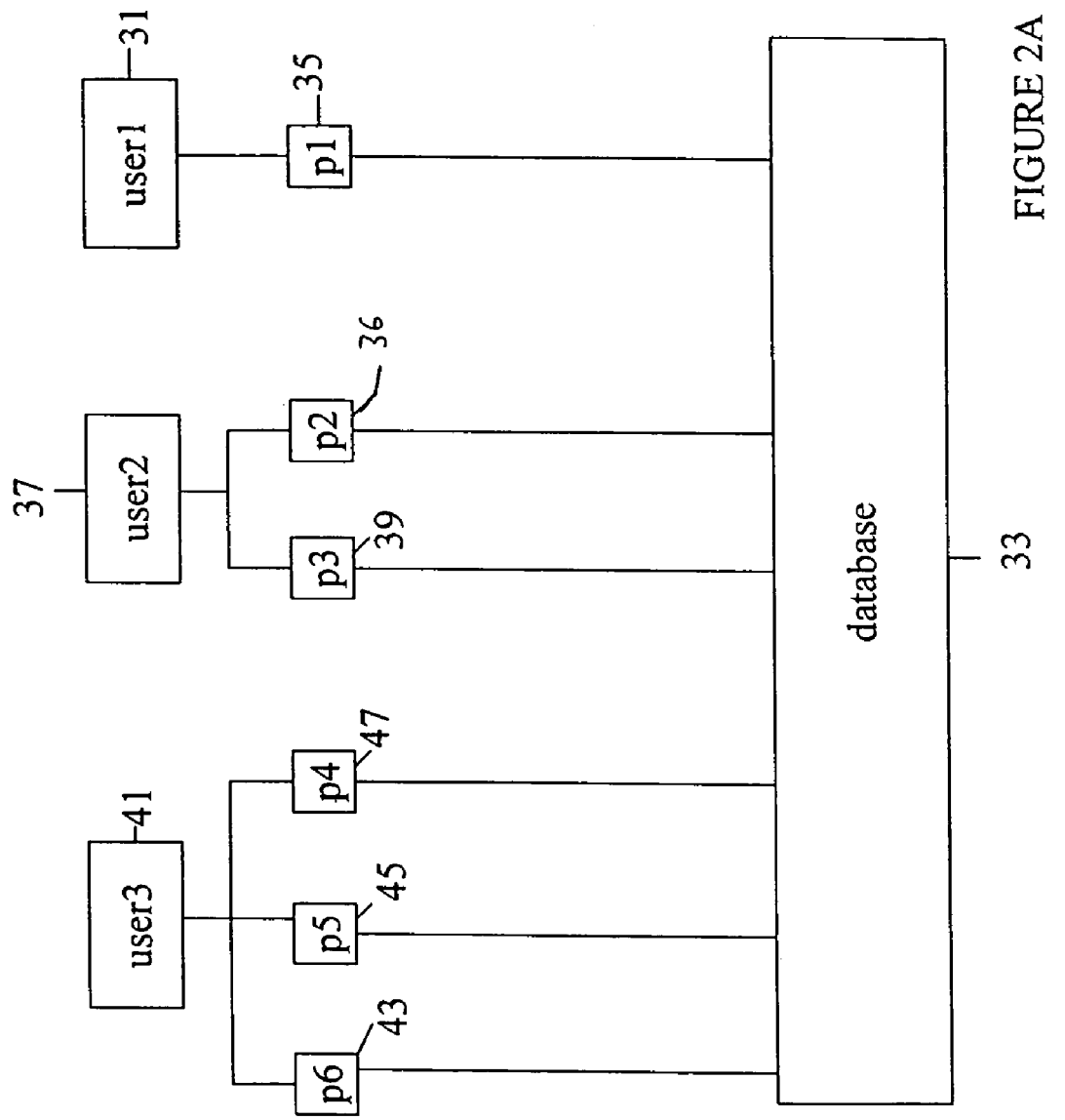
FIG. 2A illustrates a block diagram showing user interaction with a database of the present invention.

In accordance with the present invention, therefore, users are provided profiles to assist on the search of the database. This is shown in block diagram form in FIG. 2A. As illustrated in FIG. 2A, a first user 31 accesses a database 33 using a first profile 35. The profile includes information pertaining to the user. For example, the profile may contain information relating to restaurants the user prefers, businesses the user prefers to frequent, locations that the user desires to reach, or routes the user has marked an interest or other matters.

In effect, the profile serves as a filter between the database and the user. The information retrieved from the database that the users request is provided to the user based on aspects the user has entered into the profile.

The user may utilize more than one profile. This is illustrated by a second user 37. The second user accesses the database using a second profile 36 and a third profile 41. The second profile is similar to the first profile in that the second profile contains information pertaining to the specific user. The third profile differs in that the third profile is a standard profile. In other words, the third profile is a standardized profile made available for selection by users so that users may avoid the necessity of creating their own profile.

The use of multiple profiles is beneficial in that users may, depending on their activities, require different information of a different nature at different times. For example, a user may desire information of a first type relating to the users business activities. This may be due to the user working at a locale, with the result that the user desires information pertaining to the region of the locale while at work. In addition, the user may frequent certain types of businesses as part of work related activities, whereas the user may frequent different types of businesses during the user's leisure hours.

In addition, profiles may be copied. Copying of profiles is beneficial as the copied profile may be thereafter edited or added to, or have other operations under the profile. A user having a copied profile is illustrated by a third user 41. The third user accesses the database using a fourth profile 47, a fifth profile 45 and a copied sixth profile 43. The fourth and fifth profiles are, like the profiles of the first and second users, profiles pertaining to the individual user. The copied sixth profile of the third user is a copied version of the fifth profile. When created, therefore, the sixth profile is merely a copy of the fifth profile. Over time, however, the user may adjust and adapt the copied profile to suit other needs. This allows the user to use the information contained in the original profile, but allows modification to meet specific needs of the user.

FIG. 2B illustrates a data layout of one implementation of a database in accordance with the present invention. The database 21 includes plurality of memory elements. The plurality of memory elements includes subgroupings of memory elements. A three such subgrouping of memory elements are illustrated as a first subgrouping 23, a second subgrouping 25, and a third subgrouping 27. As illustrated in FIG. 2B, the first, second, and third subgroupings of memory correspond to areas of memory reserved for information for the first profile, second profile, and third profiles illustrated in FIG. 2A. Thus, in the embodiment illustrated in FIG. 2B, data is stored separately for each profile. Thus, the profiles serve as a filter into a database, namely, information relevant to a users profile is placed into the database at the request of the user. A request by the user in one embodiment includes implied requests based on profile settings provided by the user. Thus, if the user, for example, has indicated a particular store as a favorite, information regarding the store may be placed in the user's profiles section of the database without an explicit command by the user.

In an alternate embodiment, the database is more conventionally set up in which a record for each data element indicates whether the data item is applicable to a particular profile. In further embodiments of the database, data is sorted in real time based on user profile requests, and no explicit link between the profile and the data in the database is provided except upon a request.

Figure 3:
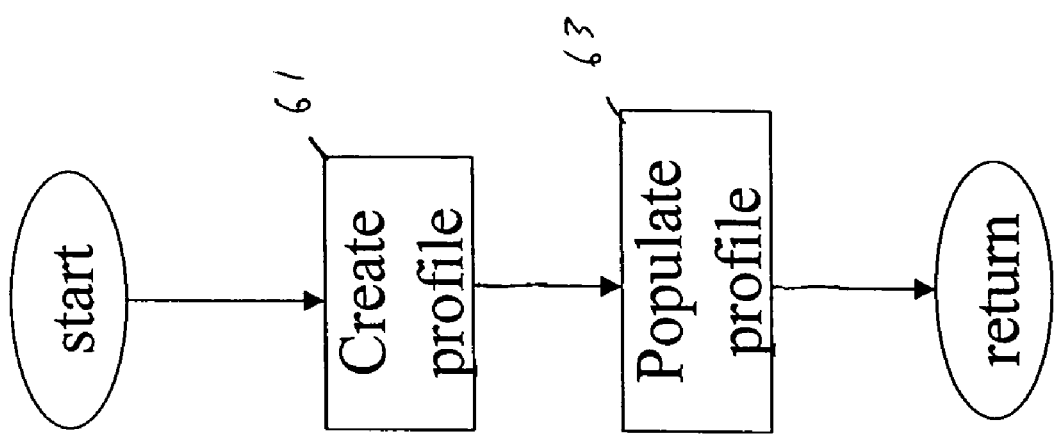
FIG. 3 illustrates a flow diagram of a process of forming profiles to interact with the database of FIG. 2.

FIG. 3 illustrates a flow diagram of a process of creating and populating a profile. In Block 61 the user creates a profile. As discussed above, the profile may be a user specific profile, a standard profile, or a copied profile. In Block 63 the user populates the profile. Populating the profile is analogous to populating a database linked to the profile. Indeed, in one embodiment of the invention populating the profile is population of a unique database linked to the profile. In other embodiments, however, populating the profile involves linking information in a database to the profile, as well as, in some embodiments, providing information to the database.

Figure 4:
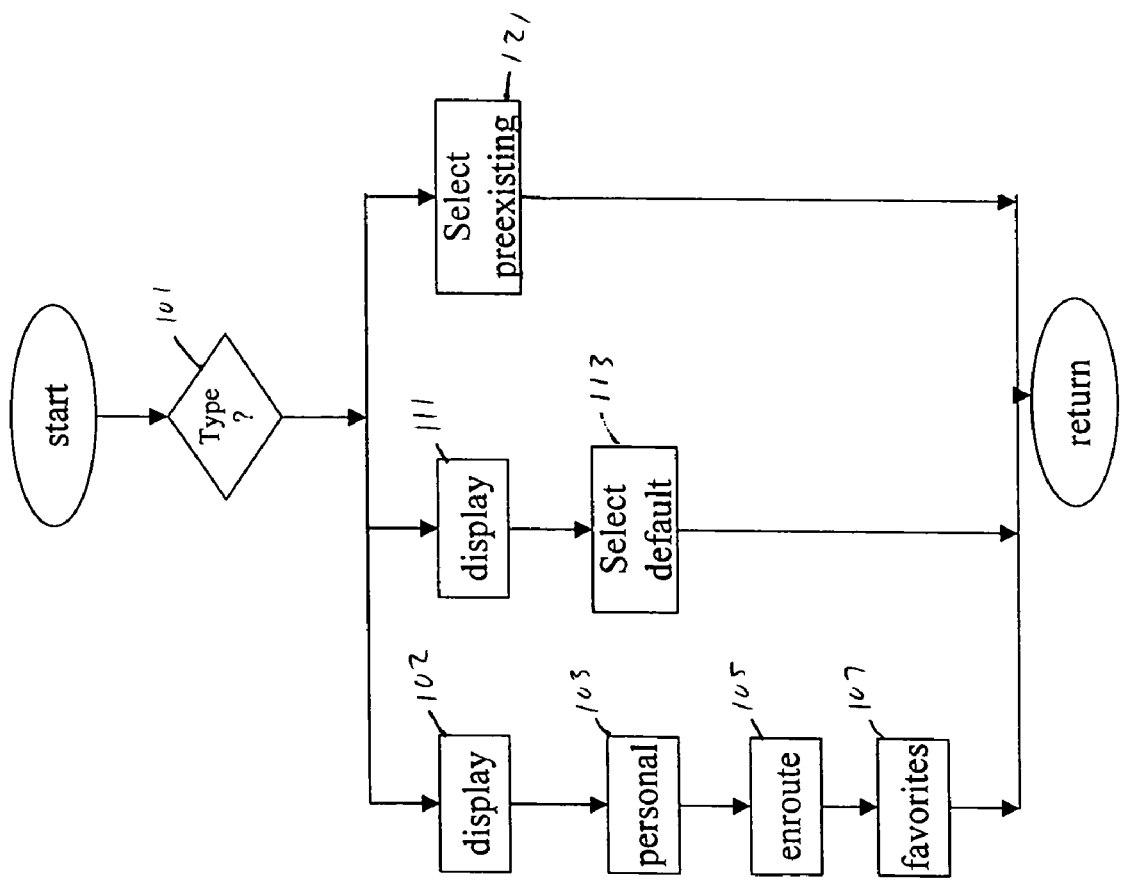
FIG. 4 illustrates a flow diagram of a process of creating profiles.

FIG. 4 illustrates details of a flow diagram of a process of creating a profile. In Block 101 the user selects a type of profile. The user, may select a new profile, a preselected profile, a clone profile, or edit of an existing profile. If the user selects a new profile the process displays a create new profile screen in Block 102. The create new profile screen is illustrated in FIG. 5. As illustrated in FIG. 5, the create new profile screen includes data entry regions for personal data 51, data entry areas for enroute profiles 53, and data entry areas for favorites 55. Accordingly, in Block 103 of the process of FIG. 4, the user enters personal data information requested by the create new profile screen. The personal data includes a profile name, the age of the user, the sex of the user, and the marital status of the user. The personal data additionally includes the occupation of the user, the city of the user, as well as the user's education, religion and children.

In Block 105 the user enters enroute data. The enroute data includes information relating to music, entertainment, sports, services, restaurants, and shopping. In Block 107 the user enters information regarding the users favorites.

If, however, the user selects a preselected profile in Block 101, then in Block 111 the process displays a list of default profiles. The default profiles are profiles for which data has previously been provided. In one embodiment, the data for the default profile is standardized based on age group and sender. For example, college age males have one default profile with standardized information, and male senior citizens have a different default profile with different standardized information. In Block 113 the user selects a default profile.

Figure 6:
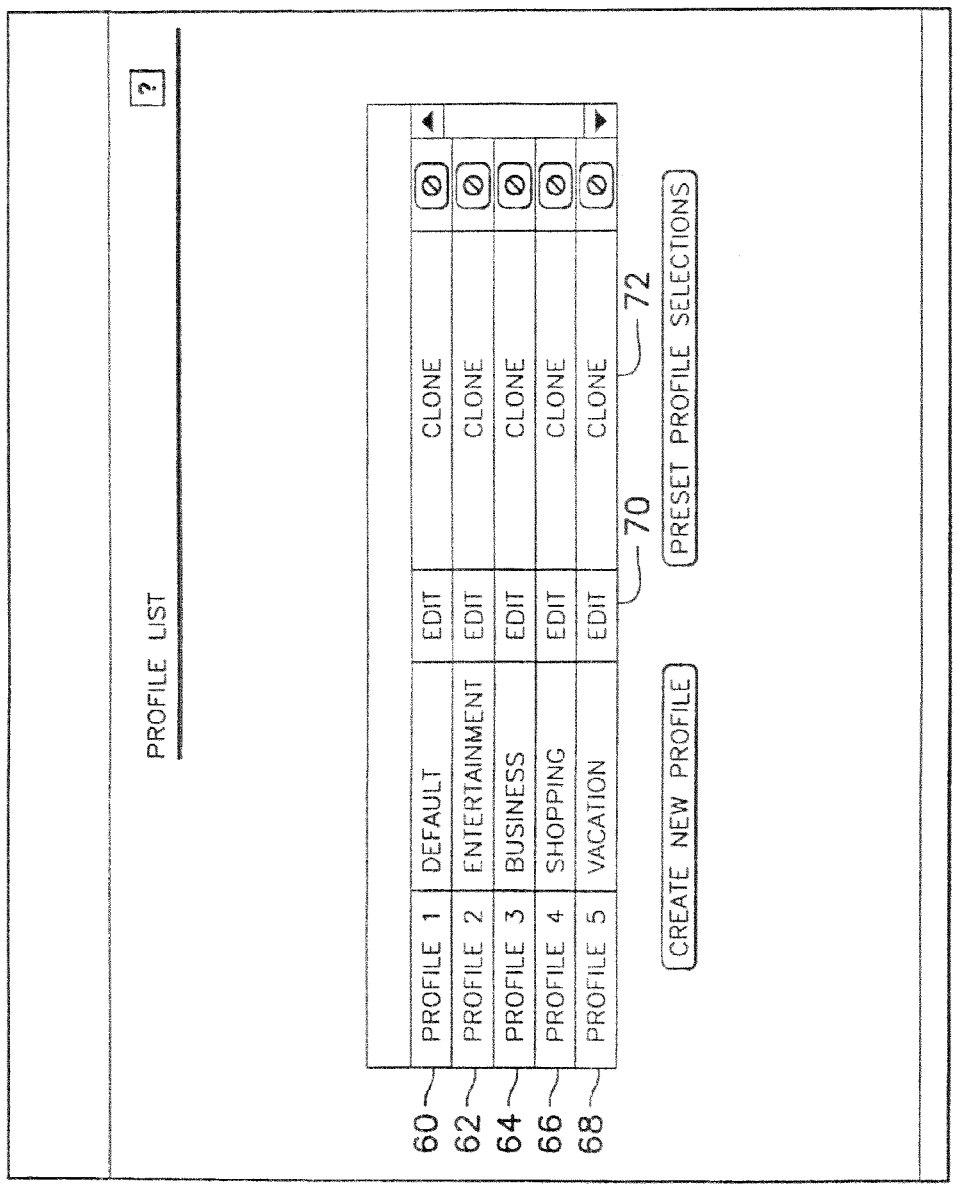
FIG. 6 illustrates an input screen for selecting a default profile.

If in Block 101 the user selects a clone type profile, in Block 121 the process displays a list of existing profiles. FIG. 6 illustrates a screen showing existing profiles for a user. As illustrated, the user has five profiles. The profiles include a default profile 60, an entertainment profile 62, a business profile 64, a shopping profile 66, and a vacation profile 68. For each of the profiles, the user is provided a choice of editing the profile via an edit button or cloning the profile via a clone button.

Figure 7:
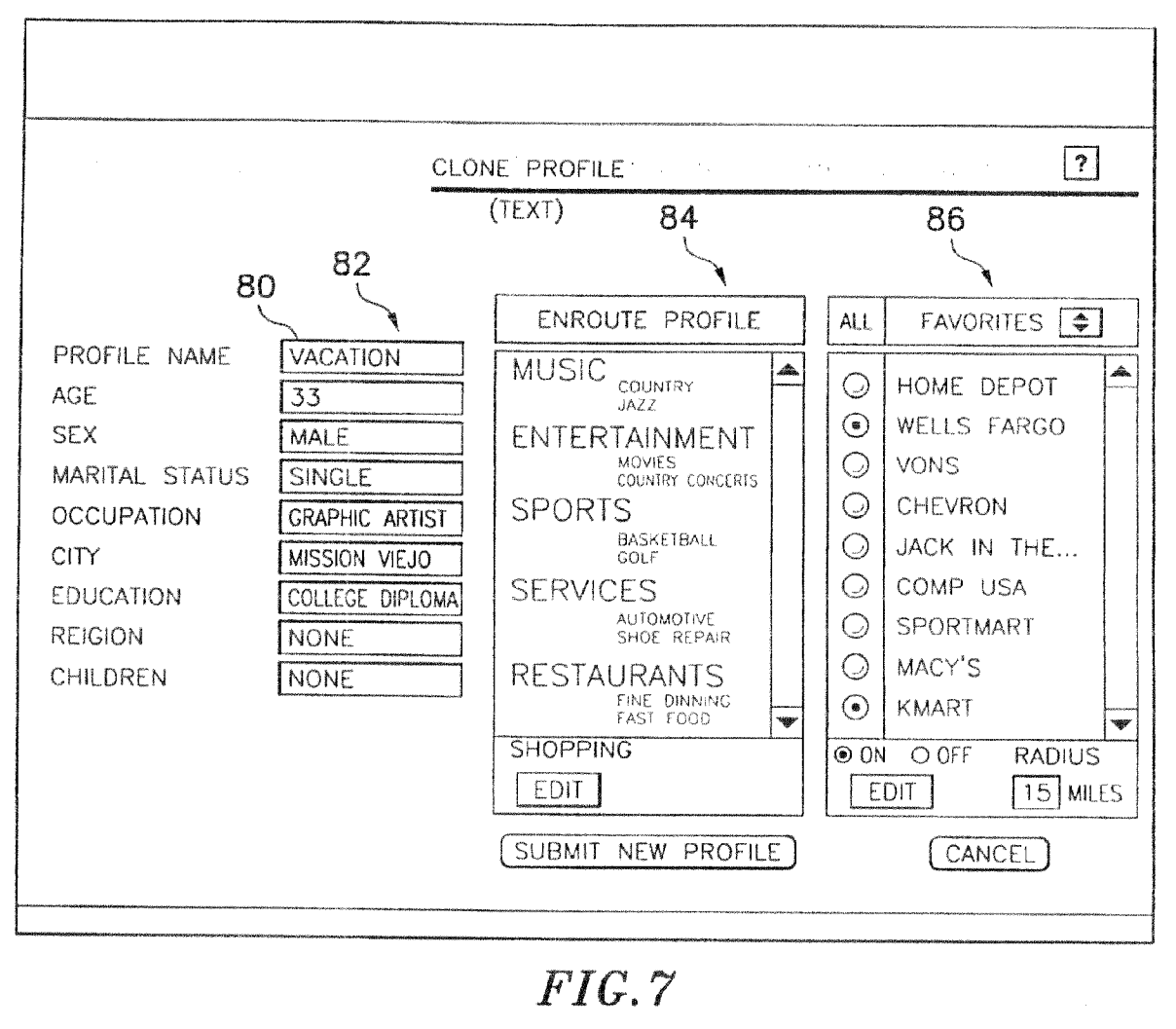

FIG. 7 illustrates a clone profile screen. The clone profile screen allows for data entry of the profile name 80 and user information 82, as well as modification of the enroute profile 84 and favorites 86. Thus, a clone profile is a copy of a preexisting profile, which may be then edited.

Similarly, FIG. 8 illustrates the result of selecting the edit button of the screen of FIG. 6. As with the clone profile of FIG. 7, via the profile screen allows for edit of the profile information 90, the enroute profile 92, and favorites 94.

Figure 9:
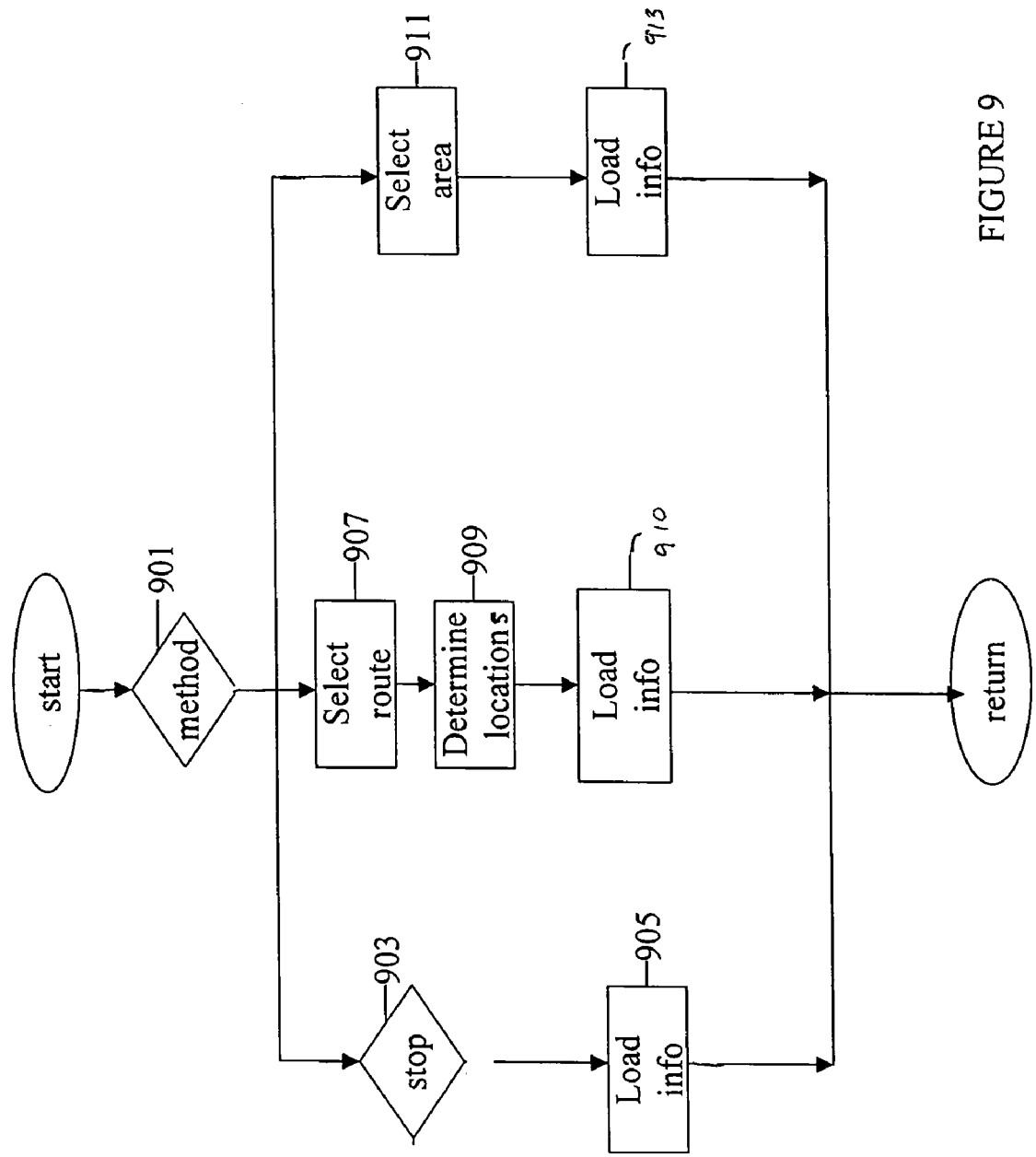
FIG. 9 illustrates a flow diagram of a process for populating a database.

FIG. 9 illustrates a flow chart of a process for populating a database. In Block 901 the process determines the method to be used in populating the database. The database may be populated either based on locations at which the PCD becomes relatively immobile, through selection of a route, or through selection of an area.

Figure 13:
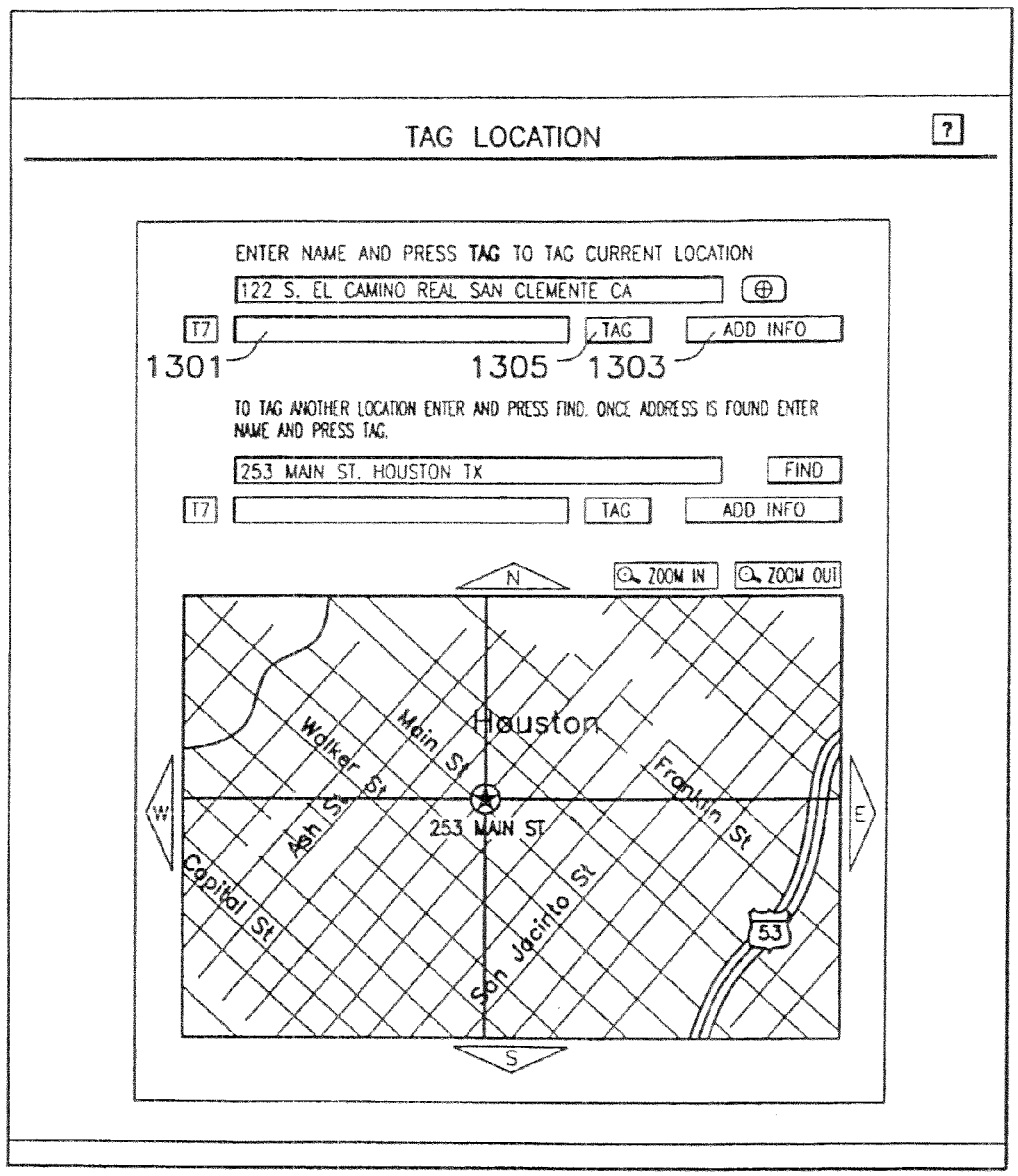
FIG. 13 illustrates a tag location screen.

If the stop, or mobility, method is selected the process proceeds to Block 903. In Block 903 the process determines if the PCD has stopped. The PCD is determined to have stopped if the PCD has moved over 500 feet within the past two minutes, but has moved less than 50 feet in the past minute. If the PCD has stopped the process in Block 905 determines the position, in one embodiment the latitude and longitude, of the stop location and transmits the position to the server. The server in turn responds with an indication of the address of the stop location, as well as any identifying information regarding that address such as phone number, name of business, or other pertinent information. In addition, optionally the process provides an input screen to allow the user to enter additional information. An example input screen is illustrated in FIG. 13. The input screen includes a name field 1301, and add information button 1303, and a tag button 1365. Once the information has been either received from the server and/or input by the user, the PCD places a request with the server in response to selection of the tag button to store the information in the user's personal database. The process thereafter returns.

If in Block 901 the process determines that the select route method has been selected the process proceeds to Block 907. In Block 907, the process determines the selected route. The route is selected by the user through scrolling of an icon across a map display. The locations corresponding to the map locations form the route selected by the user. In alternative embodiments, the PCD determines the route using the standard algorithms known in the art based on the starting point/ending point calculations. In further alternative embodiments, the PCD provides a server a starting point and an ending point, and the server determines the route. The server then provides route information to the PCD. In Block 909 the process determines a series of locations corresponding to locations along the selected route. Once the process has determined the locations corresponding to locations along a selected route the process proceeds to Block 910, in which the process, as previously described, retrieves and stores data into the database.

If in Block 901 the process determines that the select area method has been selected, the process proceeds to Block 911. In Block 911 the process determines the selected area. The area is selected by the user through use of a click and drag box on a map display. The process also determines locations corresponding to those within the click and drag box. The process then proceeds to Block 913. As previously described with respect to previously discussed Blocks, in Block 913 the process receives information regarding locations corresponding to the selected area, and stores the information in the database. The process then returns.

Figure 10:
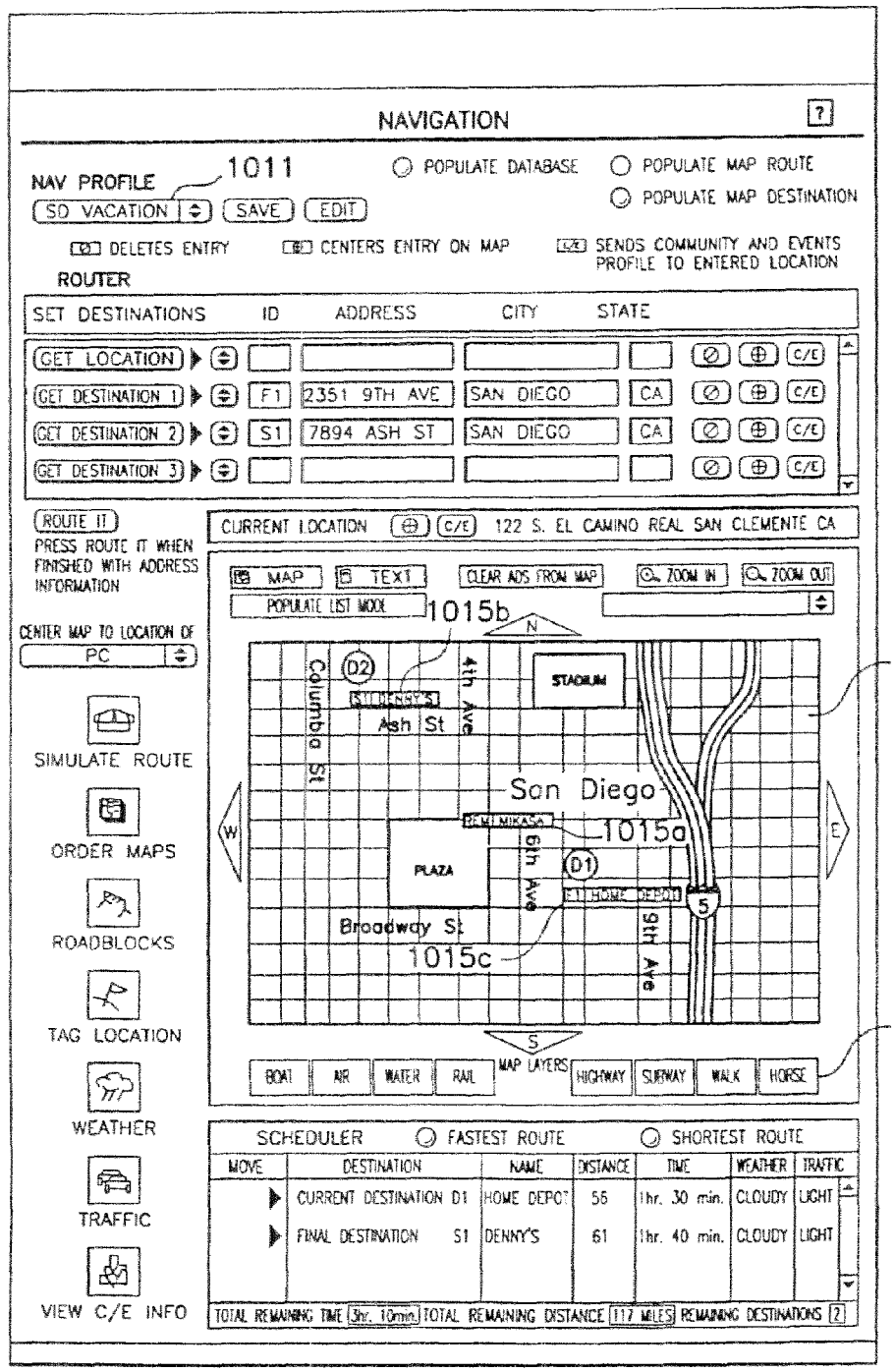
FIG. 10 illustrates a navigation screen.

FIG. 10 illustrates a display screen showing a navigation page of the present invention. The display screen provides an indication of the selected profile 1011, which as illustrated is a San Diego (SD) vacation profile. The screen display also includes a map display 1013. The map display includes a current destination D1 and a final destination D2. The map display also includes an indication of items 1015*a-c* from the favorite menu within the map display.

The display also includes selection boxes for determining a method of transportation 1017. The embodiment described eight methods of transportation are selectable. The eight methods of transportation are by foot (PED), by air, by water, by rail, by highway, by subway, by bike and by horse. The method of transportation effects both routes and time of travel. For example, subways have specific locations from which one may ingress and egress, and those locations must be taken into account when route selection occurs. In addition, the method of transportation also affects travel time. For example, traveling from one place to another by foot is likely, depending on traffic, to take longer than travel by car.

In one embodiment in the present invention, route selection is also affected by the use of road blocks. Road blocks are locations, selected by the user, which are to be avoided in the selection of many routes. Road blocks may be selected by the user, for example, to avoid areas the user, through personal preference or knowledge, wishing to avoid. For example, a user may desire to avoid certain intersections known the user to present particular difficulties with travel. Road blocks may also be selected by the user to avoid areas which the user may believe to present danger to the user or the user's property. These areas may be areas of high crime, construction zones, or even areas which are known to the user to present dangerous road driving conditions. In addition, for an automatically selected route, in one embodiment of the invention the user is provided the opportunity to place road blocks along the selected route.

Figure 11:
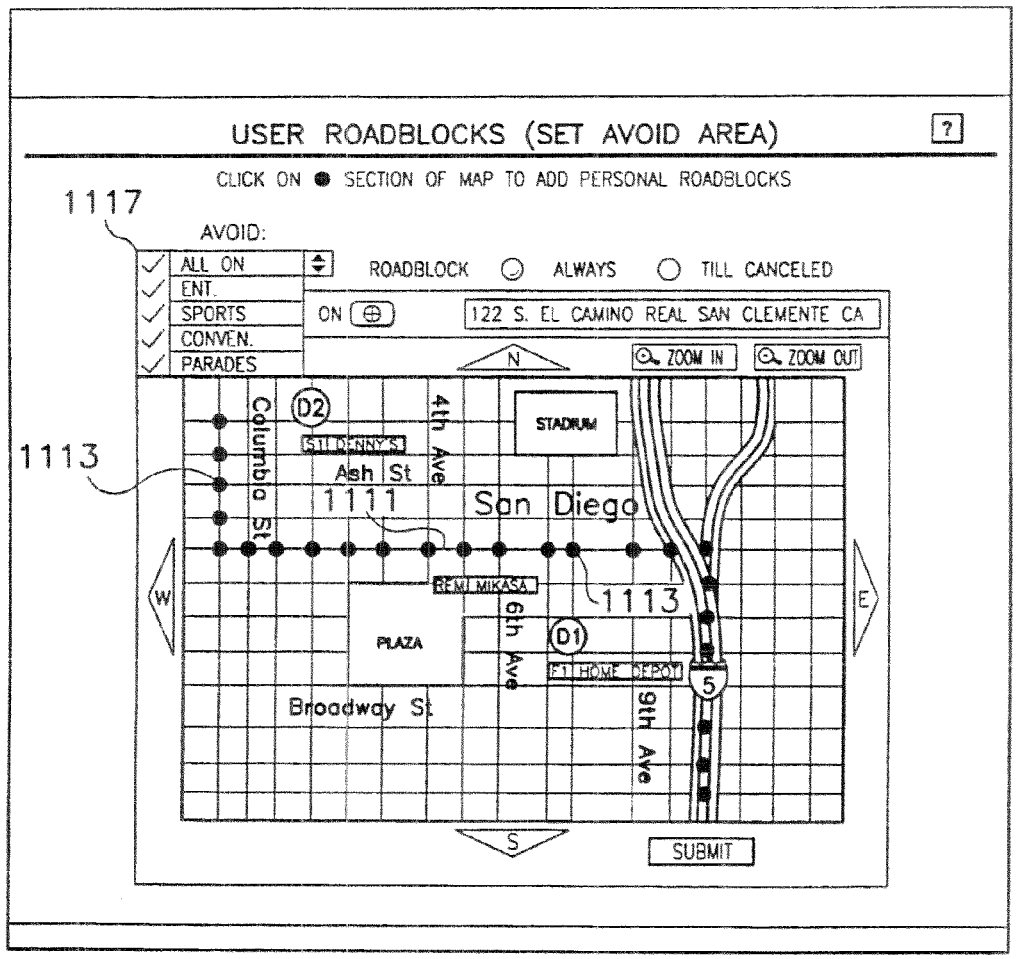
FIG. 11 illustrates a roadblocks screen.

Road blocks are illustrated in FIG. 11. FIG. 11 illustrates a user road blocks display screen. The user road blocks display screen includes an automatically selected route to the first destination D1 and a final destination D2. The automatically selected route is indicated by a bold line 1111 in the map display. Along each intersection or along the selected route a selectable button 1113 is displayed. If the user selects the button the process implements a road block at the selected location and automatically reselects a route to avoid the road block location.

In addition, as illustrated in FIG. 11 the user is provided a selection box 1117 to allow selection of certain types of activities more likely to impact traffic. As illustrated, the selection include entertainment, sports, conventions and parades. Selection of any of these items causes the process to determine, based on information available from the Internet service provider, whether such locations should be avoided.

FIG. 12 illustrates an enroute profile setting screen. The enroute profile setting screen provides two functions. A first function is to allow a user to set favorite settings for any particular profile. Accordingly, the screen includes a profile pop down menu 1211 allowing selection of a particular profile. The screen also includes button entries for categories corresponding to those which appear in the favorite profiles. Thus, button menus for music 1213, entertainment 1215, recreation 1217, restaurants 1219, miscellaneous 1221, shopping 1223, sports 1225, and services 1227 are provided. Each of the categories allow for selection of multiple items corresponding to the favorites of the user for the particular profile. For example, under the restaurants categories the groupings include those for fast food, Italian food, French food, American food, and Chinese food. The user may select one or more of these groupings.

Each of the selected groupings are available for automatic database population. For example, if a database is populated either through simulation or through actual route travel, database population is limited to those corresponding to groupings selected via the enroute profile settings. In other words, users are provided information relating to items which are of interests to them along the route they expect to take. This allows both for increased targeting of information by businesses, which will make themselves known to individuals who may be interested in their product or service, as well as allowing those individuals to filter out information relating to businesses and services for which they have no interest.

As additionally indicated in the screen of FIG. 12, users may elect to turn off population of the database via a button menu 1231. This allows the user to avoid excessively populating the database in areas the user either will not return to or does not expect to stop. Moreover, a pop down selection also is provided in the screen of FIG. 12 to allow the user to populate the database enroute or merely for the destination 1235. Population of the database enroute allows the user to locate items of interest or traveling for which the user may desire to stop. If the user knows that the user will not stop prior to reaching the destination, then the user may elect the destination button and thereby only be provided information regarding the users destination.

FIG. 13 illustrates a screen used by the user to tag a location. The tag location screen allows the user to populate a database based on either current location or an address located on their map. The tag location screen is used when the user is either at a location or knows of a location for which the user desires the information entered into the database. The tag location screen is also provided when the user is populating the database via the stop method, and the user has additional information desired to be entered. This may occur for example, when a particular business is not provided information to the ISP, but the user wishes information provided by way of the user entry into the database.

Figure 14:
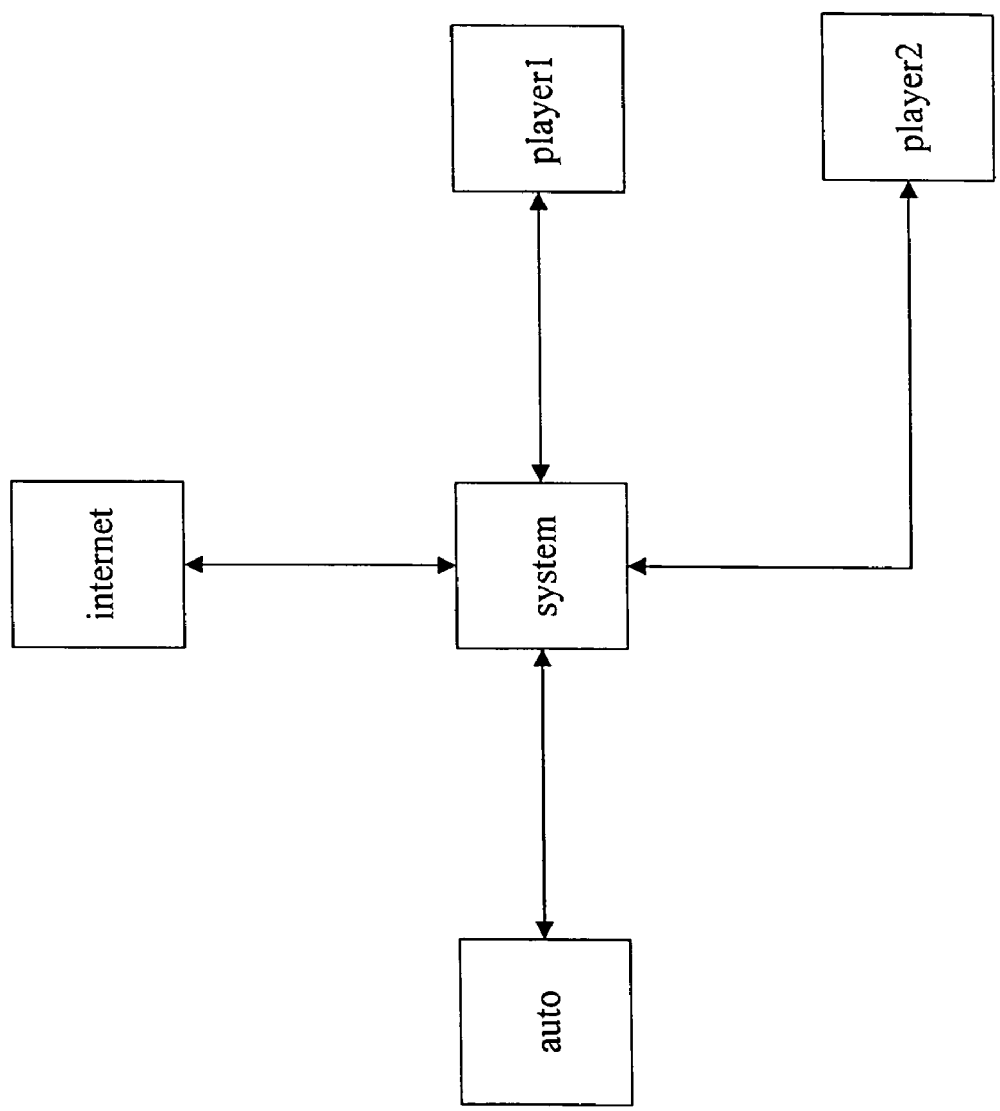
FIG. 14 illustrates a block diagram of an entertainment distribution system.

FIG. 14 illustrates a block diagram of a central music system. A central music system 1411 is a computerized system including a processor and memory. The central music system additionally includes a modem for communication over a telephone network. In other embodiments, as those skilled in the art will recognize, the modem may be replaced by a network interface card (NIC) or a cable modem, or other similar devices depending on the communication transport system.

The memory stores information in digital form, including audio files. Audio files are files which, when decoded by a suitable player, form an audio output stream which may be the reading of a book or, for example, music. The audio files store music in a variety of formats. These formats include .MP3 files, .wav files, .aud files, and the like. An .MP3 file is a compressed audio file. The audio files are obtained by transferring the audio files from an external system to the central music system. This may be done via a CD-ROM or disk reader, or by using the communication modem or the like to download information representing the audio files from the Internet.

In an alternative embodiment, the central music system is a central entertainment system. The central entertainment system is provided visual files and audio visual files in addition to sound files.

Once the audio file is loaded into the central music system, the central music system makes the audio file available to remote nodes. As illustrated in FIG. 14, the remote nodes include an automobile 1413, a first home system 1415, and a second home system 1417. The central music system transfers the music files to the requesting remote node on request. As illustrated, the first home system and the second home system are connected to the central music system via a physical link. The automobile, however, is connected to the central music system via a cellular phone.

The central music system transmits the audio file to the requesting node in the format requested by the requesting node. For example, the first home system may require audio files of a first type and the second home system may require audio files of a second type. Further, the automobile sound system may require audio files of yet a third type. The audio files stored on the central music system, however, may be of yet a fourth type. Thus, the central music system includes a file translation program. The file translation program converts audio files from one file format to another.

Figure 15:
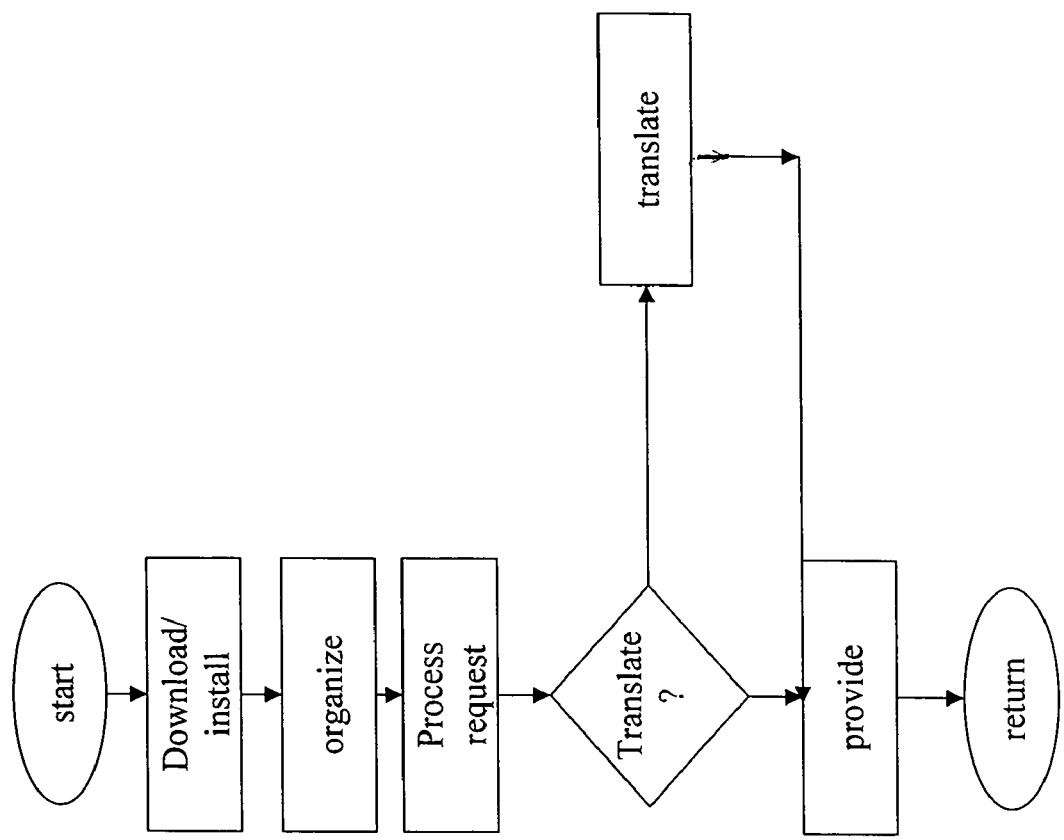
FIG. 15 illustrates a process conducted by the entertainment distribution system of FIG. 14.

FIG. 15 illustrates a process of using the central music system. In block 1511 the central music system downloads or installs an audio file. This occurs in the case of a download by downloading the audio file from another computer system, such is accomplished by downloading from the Internet.

Audio files may also be installed onto the central music system through use of a disk or CD-ROM drive.

In block 1513 a central music system organizes the audio files. The organization of audio files is accomplished at the direction of a user. For example, the user may link audio files such that a request for a first audio file will additionally inform the music system that a second audio file should follow the first audio file.

In block 1515 the central music system processes a request for an audio file. In processing the request for the audio file the central music system determines which audio file has been requested, as well as any linked audio files additionally requested.

In block 1517 the central music system determines if any of the audio files require translation to a different format. If translation of audio files from one format to another format is required the process proceeds to block 1519. In block 1519 the process translates the audio files. After performing any operations relating to translation, the process proceeds to block 1521 and provides the audio files, in the proper format, to the requesting node.

Accordingly, the present invention provides a computer navigation and media control center. Although these inventions have been described in certain specific embodiments many additional modifications and variations would be apparent to those skilled in the art. It is therefore to be understood that this invention may be practiced otherwise than as specifically described. Thus, the present embodiments of the inventions should be considered as illustrative and not restrictive, the scope of the inventions to be indicated by claims and their equivalents supported by this application rather than the foregoing description.

The invention claimed is:

1. A method, using a personal computer device having a GPS receiver, of populating a database comprising:
    determining, by the personal computer device using its GPS receiver, a location at which the personal computer device becomes relatively immobile;
    transmitting, by the personal computer device, the location of at which the personal computer device becomes relatively immobile to a server;
    receiving, by the personal computer device, information regarding the location from the server; and
    requesting, by the personal computer device, that the server store the information in a database associated with a user of the personal computer device;
    wherein determining a location at which the personal computer device becomes relatively immobile comprises:
    evaluating the position of the personal computer device using the GPS receiver;
    waiting a preselected time period; reevaluating the position of the personal computer device using the GPS receiver; and
    determining if the position of the personal computer device before and after waiting the preselected time period is substantially the same.

* * * * *